United States Patent [19]

Astley et al.

[11] 4,016,915

[45] Apr. 12, 1977

[54] PNEUMATIC TIRES

[75] Inventors: Edward Pryce Astley; Owen Morris Jones, both of Liverpool; Kenneth William Law, Frodsham, all of England

[73] Assignee: Dunlop Limited, London, England

[22] Filed: May 12, 1975

[21] Appl. No.: 576,428

[30] Foreign Application Priority Data

May 24, 1974 United Kingdom ............ 23288/74

[52] U.S. Cl. ........................... 152/355; 152/361 R
[51] Int. Cl.² ........................ B60C 9/04; B60C 9/20
[58] Field of Search ............... 152/209 B, 354–359, 152/361 R, 361 DM

[56] References Cited
UNITED STATES PATENTS

| | | | |
|---|---|---|---|
| 3,397,729 | 8/1968 | Sperberg | 152/354 |
| 3,630,258 | 12/1971 | Sperberg | 152/356 |
| 3,796,247 | 3/1974 | Martin | 152/361 R |

*Primary Examiner*—Robert B. Reeves
*Assistant Examiner*—Francis J. Bartuska
*Attorney, Agent, or Firm*—Stevens, Davis, Miller & Mosher

[57] ABSTRACT

A tire comprises a tread portion, sidewall portions, and beads, the tread portion having a tread pattern comprising a plurality of bars arranged herringbone fashion about the mid-circumferential plane of the tire, the tire being reinforced by a plurality of plies of cord fabric wherein at least one of said plies comprises cords of polyester fiber while a radially outermost cord fabric ply underlying the tread of the tire comprises a plurality of cords of polyamide fiber.

7 Claims, 5 Drawing Figures

PNEUMATIC TIRES

This invention relates to tires and particularly but not exclusively to pneumatic agricultural tires.

Large off-the-road tires such as rear tractor tires frequently have a tread pattern consisting of a series of deep bars arranged, for example in herringbone fashion, around the tire tread. The tires generally operate at a relatively low running temperature and thus polyester cord is a suitable reinforcement material for the carcass.

We have found that a problem arises in the manufacture of cross-ply rear tractor tires incorporating a polyester carcass in that during molding and subsequent vulcanization of the tires there is a tendency for air to become trapped beneath bars of the tread of the tire, which can result in defective tires. We have also found that the air is trapped primarily under those bars which lie substantially parallel to the cords of the outermost carcass ply.

According to the present invention a tire comprises a tread portion, sidewall portions, and beads, the tread portion having a tread pattern comprising a plurality of bars arranged herringbone fashion about the mid-circumferential plane of the tire, the tire being reinforced by a plurality of plies of cord fabric wherein at least one of said plies comprises cords of polyester fiber while a radially outermost cord fabric ply underlying the tread of the tire comprises a plurality of cords of polyamide fiber.

The tire can be, for example, a cross-ply pneumatic rear tractor tire whose carcass consists of several, e.g. four, biased plies extending from bead to bead. In this instance the cords of the outermost carcass ply, underlying the tread bar, would be of polyamide fiber while the three inner plies consist of polyester cords. Thus a ply of polyamide cord fabric is superimposed on the outermost polyester carcass ply.

In another construction a strip of polyamide cord fabric may be superimposed on one side of the mid-circumferential plane on an outermost carcass ply which extends both sides of said plane so as to provide an outermost ply section whose cords are at a high angle to overlying tread bars. The resulting carcass construction may be asymmetric, but this is not a disadvantage under the conditions in which the tire will normally operate.

The width of the superimposed strip need not be as much as half of the width of the tread, but the strip must cover at least the portion of the outermost carcass ply adjacent the tire shoulder.

Preferably on at least one side of the mid-circumferential plane of the tire the cords are aligned at an angle of at least 30°, and preferably between 65° and 90°, to overlying tread bars.

Two embodiments of the invention will now be described, by way of example, with reference to the accompanying drawings in which:

FIG. 1 illustrates how it is believed the problem, with which the present invention is concerned, arises in practice.

Figure 1:
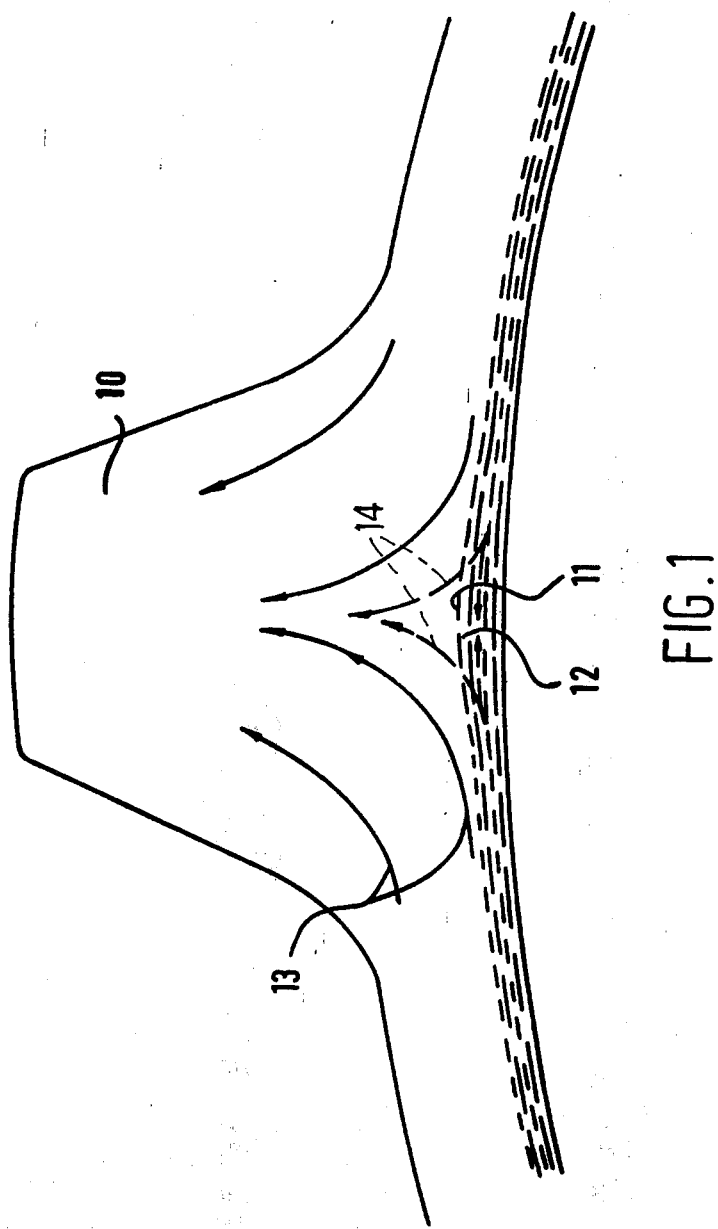
FIG. 1 is a diagrammatic section, taken parallel to the mid-circumferential plane, of a portion of tread of a cross-ply rear tractor tire.

The most probable cause of air being trapped under a tread bar 10 when the cords of the uppermost ply 11 are substantially parallel to the tread bar is that air, trapped within the tread rubber during manufacture and conducted freely along the cords in the plies, accumulates in a triangular low pressure cavity 12 which tends to be formed during molding between the flow lines 13 of the viscous rubber forming the tread and the flow lines 14 of the viscous rubber forming the casing (see FIG. 1). The viscous shear arising in the tread rubber during molding of the tire is able to strip rubber off the outermost ply, taking it towards the bar 10. In this respect it will be appreciated that during molding of a tire having this kind of tread a large volume of rubber is required to flow into the bar cavity region in the mold. This is because the tire blank before molding has an even thickness of rubber much of which has to be displaced into the bar cavities during molding to form the tread bars.

If the cords of the outermost ply 11 are parallel to the bar the length of low pressure cavity 12 encountered by the individual cords immediately underneath the bar is greater than if the plies are perpendicular to the bar, and consequently more rubber tends to be stripped off these cords. A stress is applied to each cord, tending to drag it radially outwardly toward the bar 10 in the direction of the tread shoulder, which in turn will cause a greatly reduced pressure around the plies and allow a flow of air to the base of the bar. Once the air has destroyed adhesion with the bar a permanent cavity is formed; this results in the presence of air pockets under the tread bar on extraction of the tire from the mold.

We have found that if the tire carcass plies are of polyester cords the tire is peculiarly prone to suffer from this particular problem. We have also found that even a single ply of polyamide cords, if positioned in the outermost position adjacent the tread, is sufficient to virtually eliminate this kind of failure arising in the tire.

Figure 2:
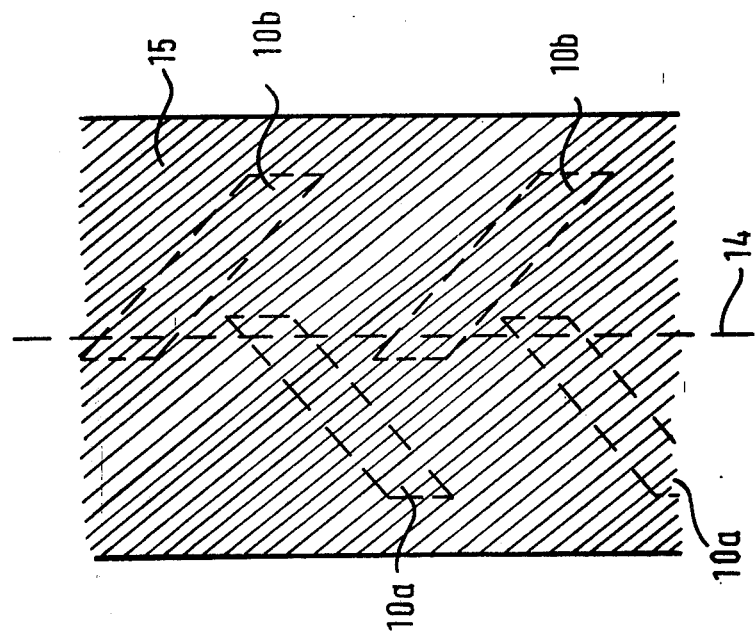
FIG. 2 is a diagrammatic plan view of the tread and underlying ply of the tire of Figure.

FIG. 2 is a plan view of a tire having a tread pattern consisting of a staggered herringbone arrangement of bars 10a, 10b inclined in opposite directions on opposite sides of the mid-circumferential plane 14 of the tire. The tyre has a cross-ply carcass so that the cords 15 of the outermost ply have a substantially constant bias angle across the tread of the tire except for a variation in angle from the crown to the tread edges.

Thus the bars 10a cross the cords 15 of the outermost ply at a high angle (about 80° – 84°) while the bars 10b on the other side of the mid-circumferential plane are almost parallel to the cords. The area of the tire where air is liable to be trapped is therefore beneath bars 10b.

Figure 3:
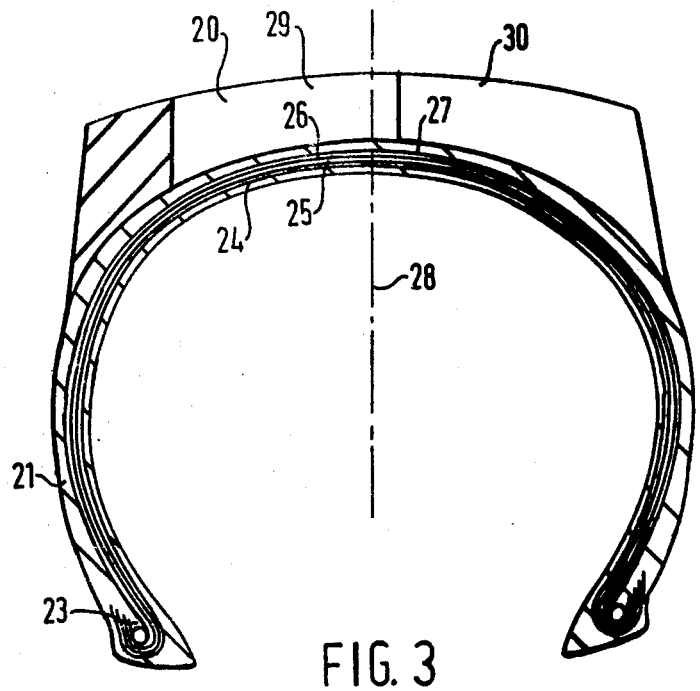
FIG. 3 is a diagrammatic cross-section through a tire made in accordance with the invention.

The tire shown in FIG. 3 is a tractor tyre of the kind illustrated in FIG. 2 having a tread 20, sidewalls 21 and beads 23. The tire is reinforced by four carcass plies 24, 25, 26 and 27 each having a finish bias angle of approximately 38° at the mid-circumferential plane 28 of the tire and made up of cords which have the opposite bias angle in adjacent plies. The cords of the plies 24, 25 and 26 are polyester cords while the cords of the ply 27 are polyamide cords whose properties in terms of extensibility and strength are matched as closely as possible to those of the polyester cords.

Tests have been carried out to make rear tractor tires having an overlying ply of polyamide cords of the kind illustrated in FIG. 3 and have shown that the presence of the polyamide cord ply results in a substantial reduction in the tendency of the tires to suffer from air cavities beneath tread bars 29 and 30.

Figure 4:
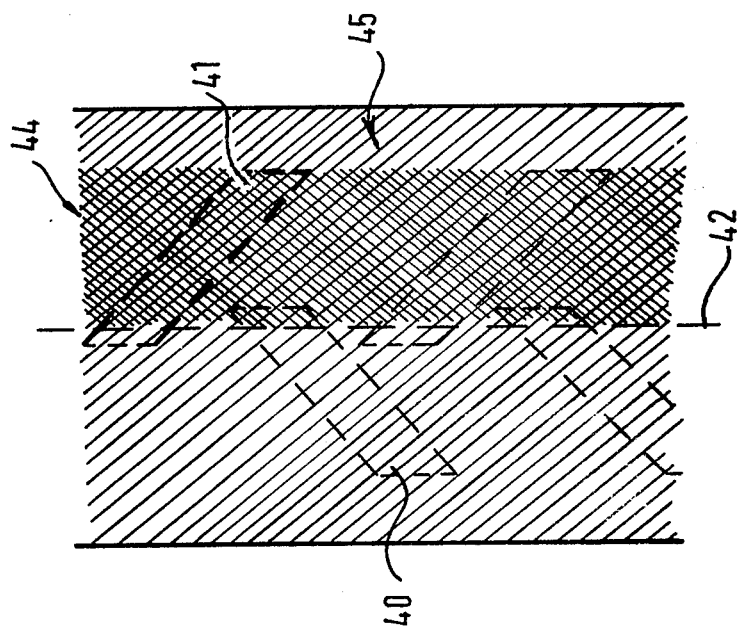
FIG. 4 is a similar view to that of FIG. 2 but of another tire in accordance with the present invention.
Figure 5:
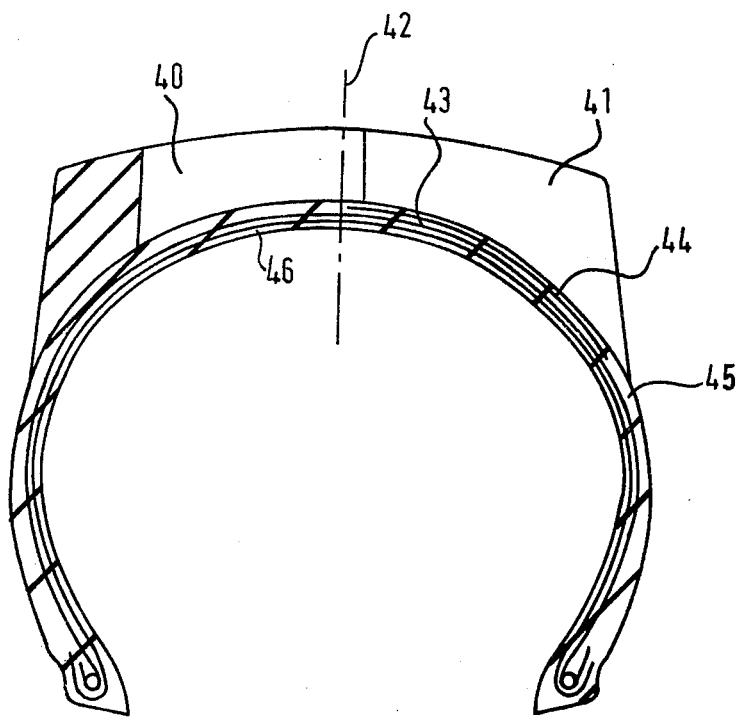
FIG. 5 is a diagrammatic cross-section through the tire shown in FIG. 4.

In a second embodiment of the invention, illustrated in FIGS. 4 and 5, a strip 44 of polyamide cord fabric has been superimposed over the outermost carcass ply of polyester cords 43 so as to lie substantially immediately below the bars 41. The strip extends inwardly from the tire shoulder region 45 to approximately the mid-circumferential plane 42 of the tire and is made up of cords which have an opposite bias angle to that of the polyester cords 43. The cords of the strip 44 thus lie at the same angle to the bars 41 as the cords 43 to the bars 40, and as illustrated in FIG. 4 this angle is a high angle of the order of 80° to 84°. The outermost carcass ply of polyamide cords 43 thus overlies a second less expensive ply reinforcement of polyester material.

Tests carried out to make rear tractor tires having an overlying strip of the kind described in the preceding paragraph have shown that the presence of the strip and the use of polyamide cords in both plies immediately underlying the bars results in a substantial reduction in the tendency of the tire to suffer from the presence of air cavities beneath the tread bars.

Having now described our invention - what we claim is:

1. An off the road tire comprising a tread portion, sidewall portions and beads, the tread portion having a tread pattern comprising a plurality of bars arranged herringbone fashion about the midcircumferential plane of the tire, the tire being reinforced by a plurality of plies of cord fabric wherein at least one of said plies comprises cords of polyester fiber while the radially outermost ply of said plurality of plies underlying the tread of the tire comprises cords of a first polyamide fiber extending on both sides of the mid-circumferential plane, and a further strip of polyamide cord fabric of opposite bias angle to the cords of said first polyamide fiber ply superimposed thereon to lie under tread bars located substantially only to one side of the mid-circumferential plane.

2. A tire according to claim 1 in which said plurality of plies comprises at least three plies of cords of polyester fiber and one ply of cords of polyamide fiber.

3. A tire according to claim 1 wherein the cords of the ply of polyester fiber have a bias angle to the mid-circumferential plane of the tire substantially equal to 38°.

4. A tire according to claim 1 wherein cords of the outermost fabric ply are aligned at an angle of at least 30° to overlying tread bars on at least one side of the mid-circumferential plane of the tire.

5. A tire according to claim 4 wherein the cords are aligned relative to overlying tread bars at an angle of between 65° and 90°.

6. A tire according to claim 1 wherein the further strip of polyamide cord fabric extends over less than half the width of the tire tread.

7. A tire according to claim 1 wherein the cords in the outermost cord fabric ply on either side of the midcircumferential plane are aligned at substantially equal angles to overlying tread bars.

* * * * *